United States Patent
Zhang et al.

(10) Patent No.: US 10,063,335 B2
(45) Date of Patent: Aug. 28, 2018

(54) METHOD, APPARATUS AND SYSTEM FOR REMOTELY CONFIGURING PTP SERVICE OF OPTICAL NETWORK UNIT

(71) Applicant: ZTE CORPORATION, Shenzhen, Guangdong Province (CN)

(72) Inventors: Qingguo Zhang, Shenzhen (CN); Jianmei Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/504,020

(22) PCT Filed: Mar. 16, 2015

(86) PCT No.: PCT/CN2015/074339
§ 371 (c)(1),
(2) Date: Feb. 15, 2017

(87) PCT Pub. No.: WO2016/026290
PCT Pub. Date: Feb. 25, 2016

(65) Prior Publication Data
US 2017/0272191 A1  Sep. 21, 2017

(30) Foreign Application Priority Data
Aug. 19, 2014  (CN) .......................... 2014 1 0410718

(51) Int. Cl.
*H04J 3/06* (2006.01)
*H04Q 11/00* (2006.01)
*H04L 7/00* (2006.01)

(52) U.S. Cl.
CPC .......... *H04J 3/0673* (2013.01); *H04J 3/0623* (2013.01); *H04L 7/0075* (2013.01); *H04Q 11/0067* (2013.01); *H04Q 2011/0081* (2013.01)

(58) Field of Classification Search
CPC .. H04J 14/0282; H04J 14/0226; H04J 3/0673; H04J 3/0263; H04B 10/272; H04Q 11/0067; H04Q 2011/0081; H04N 7/22; H04L 7/0075
See application file for complete search history.

(56) References Cited

U.S. PATENT DOCUMENTS

2011/0262133 A1  10/2011 Yuan
2016/0112185 A1*  4/2016 Yin ....................... H04J 3/0655
398/58

FOREIGN PATENT DOCUMENTS

| CN | 101662702 A | 3/2010 |
|----|-------------|--------|
| CN | 101841736 A | 9/2010 |
| CN | 102340396 A | 2/2012 |

(Continued)

*Primary Examiner* — Ted Wang
(74) *Attorney, Agent, or Firm* — Ling Wu; Stephen Yang; Ling and Yang Intellectual Property (57) ABSTRACT

The present disclosure discloses a method for remotely configuring a Precision Time Protocol PTP service of an Optical Network Unit ONU. The method includes: after an ONU performs an initialization, the ONU creates a PTP management entity; the ONU receives a PTP management entity attribute sent by an OLT and set by the OLT; and the ONU parses the PTP management entity attribute sent by the OLT and sets a corresponding PTP service according to the PTP management entity attribute. The present disclosure further discloses an ONU, an OLT and a system corresponding to the method.

13 Claims, 3 Drawing Sheets

(56) References Cited

FOREIGN PATENT DOCUMENTS

CN 103873179 A 6/2014
WO 2013191608 A1 12/2013

* cited by examiner

METHOD, APPARATUS AND SYSTEM FOR REMOTELY CONFIGURING PTP SERVICE OF OPTICAL NETWORK UNIT

TECHNICAL FIELD

The present disclosure relates to the technical field of Gigabit Passive Optical Networks GPONs, in particular to a method, an apparatus and a system for remotely configuring a Precision Time Protocol PTP or 1588 service of an Optical Network Unit ONU.

BACKGROUND

Figure 1:
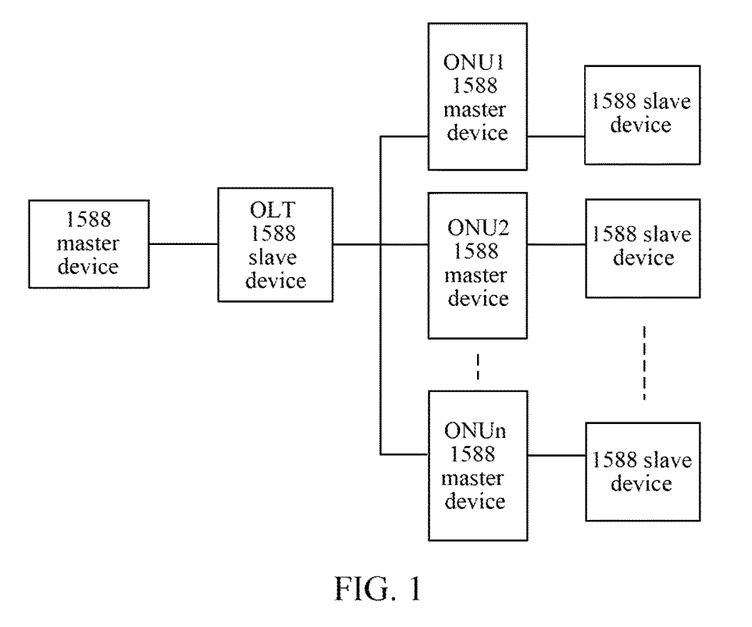
FIG. 1 illustrates a schematic diagram of one of scenarios of a passive optical network PTP service.

IEEE 1588v2 is a precision time protocol for a network measurement and control system, i.e., PTP or 1588, and can realize frequency and phase synchronization. PTP adopts a master/slave synchronization mode, i.e., master and slave devices complete a synchronization function based on a mode of network data packet sending and receiving timestamps. A GPON may complete clock and time synchronization by adopting the following mode: an Optical Line Terminal OLT is upwards connected to a time source to acquire time information and then transmits the time information to an ONU to complete time synchronization between the OLT and the ONU. As an IEEE 1588 master device, the ONU generates a new PTP message and sends the new PTP message to a subordinate 1588 slave device through an Ethernet interface. By adopting that mode, the effects that the ONU is downwards connected to the slave device and the OLT is upwards connected to the time source can be realized, i.e., the time synchronization between the master devices can be realized, specifically as illustrated in FIG. 1. Of course, the PTP service of the passive optical network is not limited to the application scenario illustrated in FIG. 1, and the application scenarios may also be other application scenarios.

At present, 1588 configuration of the ONU is completed mainly in a Telnet or serial port mode. Herein, 1588 configuration of the ONU cannot be remotely configured in the serial port mode. The Telnet mode also has a certain limitation that an IP address must be firstly configured to the ONU, the ONU address can be reached through Ping and otherwise the ONU cannot be logged for configuration. Ping is also a communication protocol and is part of TCP/IP protocol.

GPON standard G.984.4 defines an Optical Network Terminal Management and Control Interface OMCI. The standard defines some Management Entities MEs and operating methods. The configuration management, fault management, performance management and security management of the ONU may be realized through operations performed by the OMCI on the ONU management entity. G.988 further perfects the G.984.4. The G.988 additionally designs a time-of-day information attribute for the management entity OLT-G. OLT time information may be transmitted to the ONU through the entity OLT-G, to complete time synchronization between the OLT and the ONU. However, G.988 does not define a management entity for configuring the IEEE 1588 service. Therefore, the remote configuration of the ONU 1588 service cannot be realized through the OMCI.

SUMMARY

To solve the technical problem in the related art, embodiments of the present disclosure provide a method, an apparatus and a system for remotely configuring a PTP service of an ONU.

An embodiment of the present disclosure provides a method for remotely configuring a PTP service of an ONU. The method includes:

after an ONU performs an initialization, the ONU creates a PTP management entity;

the ONU receives a PTP management entity attribute sent by an OLT and set by the OLT; and the ONU parses the PTP management entity attribute sent by the OLT and sets a corresponding PTP service according to the PTP management entity attribute.

Herein, a number of PTP management entities created by the ONU is one or more.

In one embodiment, the method further includes:

the ONU receives an operation type of the PTP management entity sent by the OLT and set by the OLT.

In one embodiment, the method further includes:

if a PTP service type needs to be changed in a system operation process, the ONU receives a new PTP management entity attribute sent by the OLT and set by the OLT; and the ONU parses the new PTP management entity attribute sent by the OLT and sets a new PTP service according to the new PTP management entity attribute.

An embodiment of the present disclosure further provides a method for remotely configuring a PTP service of an ONU. The method includes:

after an ONU performs an initialization, the ONU creates a PTP management entity;

an OLT sets a PTP management entity attribute and sends the PTP management entity attribute to the ONU; and the ONU receives and parses the PTP management entity attribute and sets a corresponding PTP service according to the PTP management entity attribute.

In one embodiment, the method further includes:

the OLT sets an operation type of the PTP management entity and sends the operation type of the PTP management entity to the ONU.

In one embodiment, the method further includes:

if a PTP service type needs to be changed in a system operation process, the OLT sets a new PTP management entity attribute and sends the new PTP management entity attribute to the ONU; and the ONU receives and parses the new PTP management entity attribute sent by the OLT and sets a new PTP service according to the new PTP management entity attribute.

An embodiment of the present disclosure further provides a method for remotely configuring a PTP service of an ONU. The method includes:

after an ONU performs an initialization and creates a PTP management entity, an OLT sets a PTP management entity attribute and sends the PTP management entity attribute to the ONU;

herein, the PTP management entity attribute, after being received and parsed by the ONU, is used as a basis for the ONU to set a corresponding PTP service.

In one embodiment, the method further includes:

the OLT sets an operation type of the PTP management entity and sends the operation type of the PTP management entity to the ONU.

In one embodiment, the method further includes:

if a PTP service type needs to be changed in a system operation process, the OLT sets a new PTP management entity attribute and sends the new PTP management entity attribute to the ONU;

herein, the new PTP management entity attribute, after being received and parsed by the ONU, is used as a basis for the ONU to set a new PTP service.

An embodiment of the present disclosure further provides an ONU, including: an OMCI protocol processing module and a PTP processing module.

The OMCI protocol processing module is arranged to, after the ONU performs an initialization, create a PTP management entity, and receive a PTP management entity attribute sent by an OLT and set by the OLT, and perform a parsing.

The PTP processing module is arranged to set a corresponding PTP service according to the PTP management entity attribute obtained through the parsing performed by the OMCI protocol processing module.

Herein, the OMCI protocol processing module is further arranged to receive an operation type of the PTP management entity sent by the OLT and set by the OLT.

Herein, if a PTP service type needs to be changed in a system operation process, the OMCI protocol processing module is further arranged to receive a new PTP management entity attribute sent by the OLT and set by the OLT and perform a parsing.

Correspondingly, the PTP processing module is further arranged to set a new PTP service according to the new PTP management entity attribute obtained through the parsing performed by the OMCI protocol processing module.

An embodiment of the present disclosure further provides an OLT, including an OMCI protocol processing module and a sending module.

The OMCI protocol processing module is arranged to, after an ONU performs an initialization and creates a PTP management entity, set a PTP management entity attribute.

The sending module is arranged to send the set PTP management entity attribute to the ONU.

Herein, the PTP management entity attribute, after being received and parsed by the ONU, is used as a basis for the ONU to set a corresponding PTP service.

Herein, the OMCI protocol processing module is further arranged to set an operation type of the PTP management entity.

Correspondingly, the sending module is further arranged to send the set operation type of the PTP management entity to the ONU.

Herein, if a PTP service type needs to be changed in a system operation process, the OMCI protocol processing module is further arranged to set a new PTP management entity attribute.

Correspondingly, the sending module is further arranged to send the new PTP management entity attribute to the ONU.

Herein, the new PTP management entity attribute, after being received and parsed by the ONU, is used as a basis for the ONU to set a new PTP service.

An embodiment of the present disclosure further provides a system for remotely configuring a PTP service of an ONU, including: the ONU and the OLT described above.

According to the method, the apparatus and the system for remotely configuring the PTP service of the ONU provided by the embodiments of the present disclosure, after an ONU performs an initialization, the ONU creates a PTP management entity; the ONU receives the PTP management entity attribute sent by an OLT and set by the OLT; and the ONU parses the PTP management entity attribute sent by the OLT and sets a corresponding PTP service according to the PTP management entity attribute. By adopting the embodiment of the present disclosure, after the ONU completes GPON registration, gets on line normally and establishes an OMCI channel, the configuration of the ONU PTP service can be completed at the OLT side, and thereby the remote configuration of the PTP service through the OMCI is realized. In addition, the in-band management of the IP configuration through the ONU is not needed, so IP address resources are saved. Besides, the configuration method provided by the embodiment of the present disclosure is easy to maintain and manage and facilitates batch configuration.

DESCRIPTION OF DRAWINGS

In the drawings (which are not drawn necessarily to scale), similar reference signs may describe similar parts in different views. Similar reference signs suffixed with different letters may represent different examples of similar parts. The drawings approximately illustrate various embodiments discussed in the document in an exemplary way instead of a restrictive way.

SPECIFIC EMBODIMENTS

In embodiments of the present disclosure, after an ONU performs an initialization, the ONU creates a PTP management entity; and the ONU receives the PTP management entity attribute sent by an OLT and set by the OLT; and the ONU parses the PTP management entity attribute sent by the OLT and sets a corresponding PTP service according to the PTP management entity attribute.

The present disclosure will be further described below in detail in combination with the drawings and the specific embodiments.

Figure 2:
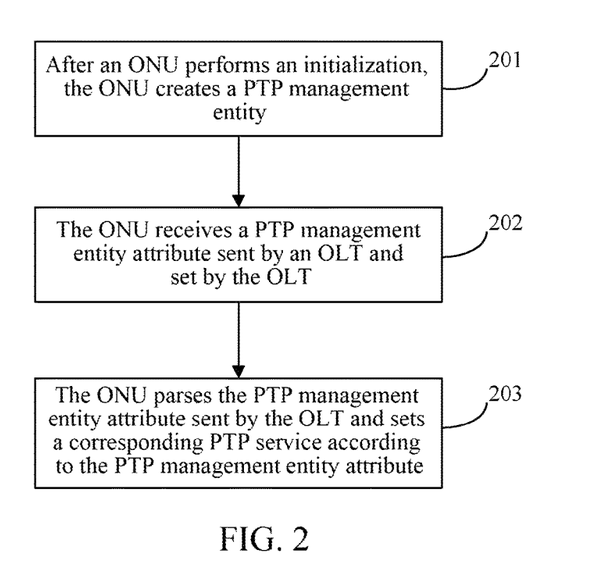
FIG. 2 illustrates a flowchart of implementation of a method for remotely configuring a PTP service of an ONU provided by one embodiment of the present disclosure.

FIG. 2 illustrates a flowchart of implementation of a method for remotely configuring a PTP service of an ONU provided by an embodiment of the present disclosure. As illustrated in FIG. 2, the method includes steps 201-203.

In step 201, after an ONU performs an initialization, the ONU creates a PTP management entity.

For example, after an ONU is started to perform initialization of an internal OMCI protocol processing module and a PTP processing module, the OMCI protocol processing module creates a PTP management entity. Here, the manner for creating the PTP management entity may adopt a general management entity creating method, and is not described in detail here.

Here, the ONU may create one or more PTP management entities. A specific number of the PTP management entities created by the ONU is related to a number of PTP ports supported by the ONU.

In step 202, the ONU receives a PTP management entity attribute sent by an OLT and set by the OLT.

For example, the OMCI protocol processing module in the OLT sets an attribute corresponding to the PTP management entity and sends the attribute of the PTP management entity to the ONU through a Set message.

In step 203, the ONU parses the PTP management entity attribute sent by the OLT and sets a corresponding PTP service according to the PTP management entity attribute.

For example, the OMCI protocol processing module in the ONU performs a parsing to obtain the PTP management entity attribute after receiving the Set message carrying the PTP management entity attribute and sent by the OLT, and the PTP processing module sets a corresponding PTP service according to the PTP management entity attribute obtained through the parsing performed by the OMCI protocol processing module. The ONU feeds a result indicating whether the setting of the PTP service succeeds back to the OLT through an OMCI message, i.e., the PTP processing module in the ONU feeds the result indicating whether the setting of the PTP service succeeds back to the OLT through the OMCI protocol processing module.

Here, for different PTP services, the PTP management entity attributes set by the OLT are different.

In the embodiments of the present disclosure, the created PTP management entity may be set as: PTP config data (called PCD for short). Of course, the created PTP management entity may also be set as other names. A management entity class value corresponding to the PCD may be set as 400. Of course, other entity numbers reserved by G.988 standard may also be selected, as shown in Table 1.

TABLE 1

| Management entity class value | Management entity |
|---|---|
| 400 | PTP config data |

The attribute of the PTP management entity set by the OLT, i.e., the attribute of the PCD includes: PTP management entity identification, administrative state, PTP state, transport type, far-end MAC, near-end MAC, near-end IP, far-end IP, transit mode, TCI, synchronization step, PTP priority and clock class.

In one embodiment, the method provided by the embodiment of the present disclosure further includes the following operation: the ONU receives an operation type of the PTP management entity sent by the OLT and set by the OLT. The operation type includes: Get, Set and Alarm.

The attribute of the PTP management entity will be introduced below.

The PTP management entity identification, which is also a managed entity ID: the attribute provides a unique number for each instance of the managed entity. The attribute is readable, and is set when a management entity is created, and is compulsory and is represented by using 2 bytes.

The administrative state: the attribute represents whether a port PTP service is enabled. Value 1 represents that the port PTP service is enabled and value 0 represents that the port PTP service is disabled. The attribute is readable and writable, and is set when a management entity is created, and is compulsory and is represented by using 1 byte.

The PTP state: the attribute represents a port PTP state, value 0 represents master, value 1 represents slave and value 2 represents passive.

The attribute is readable, and is set when a management entity is created, and is compulsory and is represented by using 1 byte.

The transport type: the attribute represents a PTP service package type.

When the attribute is 0x1, it represents IEEE Std 802.3 Ethernet package.

When the attribute is 0x2, it represents UDP/IPv4 package.

When the attribute is 0x3, it represents UDP/IPv6 package.

The attribute is readable and writable, and is set when the management entity is set, and is compulsory and is represented by using 1 byte.

The near-end MAC: the attribute represents a source MAC address when a 1588 service is transported.

The attribute is readable and writable, and is set when the management entity is set, and is compulsory and is represented by using 6 bytes.

The far-end MAC: the attribute represents a destination MAC address when the 1588 service is transported.

The attribute is readable and writable, and is set when the management entity is set, and is compulsory and is represented by using 6 bytes.

The near-end IP: when the 1588 service is transported based on IP, the attribute points to one instance of a UDP configuration data managed entity. If the 1588 service is not transported on IP, a default value 0 is used. The attribute is readable, and is set when a management entity is created, and is compulsory for IP-based transport and is represented by using 2 bytes.

The far-end IP: when the 1588 service is transported based on IP, the attribute refers to an IP address containing a far-end endpoint. If the 1588 service is not transported on IP, a default value 0 is used.

The attribute is readable, and is set when a management entity is created, and is compulsory for IP-based transport and is represented by using 2 bytes.

The transit mode: the attribute includes unicast and multicast.

When the attribute is 0x1, it represents unicast communication.

When the attribute is 0x2, it represents multicast communication.

The attribute is readable and writable, and is set when a management entity is created, and is compulsory and is represented by using 1 byte.

The TCI: the attribute represents PTP service tag information. If the 1588 service requires a tag policy, the attribute designates tag control information and includes VLAN value, priority bit and CFI bit.

The attribute is readable, writable and optional, and is represented by using 2 bytes.

The synchronization step: the attribute represents synchronization steps. Steps of PTP synchronization include 1 step and 2 steps.

When the attribute is 0x1, it represents 1-step synchronization.

When the attribute is 0x2, it represents 2-step synchronization.

The attribute is readable and writable, and is set when a management entity is created, and is compulsory and is represented by using 1 byte.

The PTP priority: the attribute is used when a best master clock (called BMC for short) algorithm is executed. The attribute includes priority 1 and priority 2, value ranges of which are 0-255. The attribute is represented by using 2 bytes. Herein, the first byte is priority 1 and the last byte is priority 2.

The attribute is readable and writable, and is set when a management entity is created, and is compulsory and is represented by using 2 bytes.

The clock class: a value range of the clock class is 0-255.

The attribute is readable and writable, and is set when a management entity is created, and is compulsory and is represented by using 1 byte.

Setting of Alarm in the operation type is as shown in Table 2.

TABLE 2

| Number | Alarm | Description |
| --- | --- | --- |
| 0 | PON unlock alarm | ONU does not lock OLT 8k clock. |
| 1 | Sync loss alarm | ONU does not send Sync message when used as 1588 master. |
| 2 | Delay Req loss alarm | ONU does not receive Delay Req message when used as 1588 master. |

It needs to be stated that, in the embodiments of the present disclosure, the specific settings performed on the PTP management entity attribute and the operation include but not limited to the description above. For example, other settings may be adopted for selection of byte length and names, sequence of entity attribute setting, etc.

In one embodiment, the method in the embodiment of the present disclosure further includes the following operations.

If a PTP service type needs to be changed in a system operation process, the ONU receives a new PTP management entity attribute sent by the OLT and set by the OLT; and the ONU parses the new PTP management entity attribute sent by the OLT and sets a new PTP service according to the new PTP management entity attribute.

Figure 3:
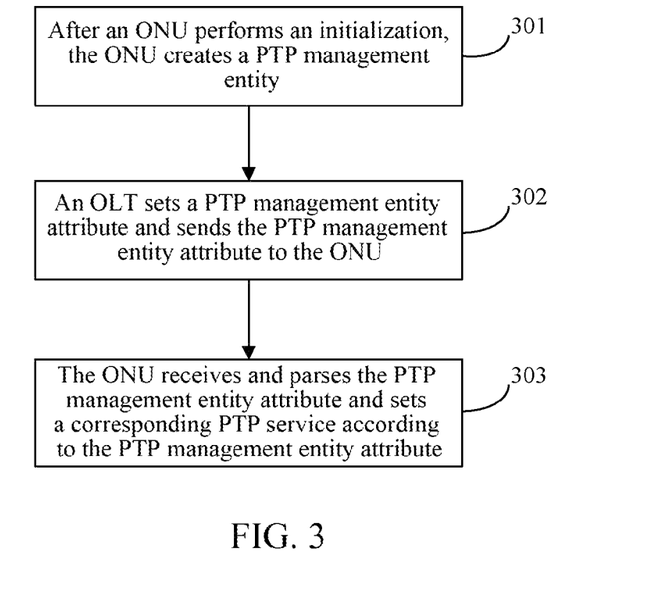
FIG. 3 illustrates a flowchart of implementation of a method for remotely configuring a PTP service of an ONU provided by another embodiment of the present disclosure.

An embodiment of the present disclosure further provides a method for remotely configuring a PTP service of an ONU. As illustrated in FIG. 3, the method includes steps 301-303.

In step 301, after an ONU performs an initialization, the ONU creates a PTP management entity.

In step 302, an OLT sets a PTP management entity attribute and sends the PTP management entity attribute to the ONU.

In step 303, the ONU receives and parses the PTP management entity attribute and sets a corresponding PTP service according to the PTP management entity attribute.

Refined description of steps 301-303 is the same as that of the method illustrated in FIG. 2 and thus is not described in detail.

Here, the ONU may create one or more PTP management entities. A specific number of the PTP management entities created by the ONU is related to a number of PTP ports supported by the ONU.

In one embodiment, the method provided by the embodiment of the present disclosure further includes the following operation. The OLT sets an operation type of the PTP management entity and sends the operation type of the PTP management entity to the ONU. The operation type includes: Get, Set and Alarm.

In one embodiment, the method provided by the embodiment of the present disclosure further includes the following operations.

If a PTP service type needs to be changed in a system operation process, the OLT sets a new PTP management entity attribute and sends the new PTP management entity attribute to the ONU; and the ONU receives and parses the new PTP management entity attribute sent by the OLT and sets a new PTP service according to the new PTP management entity attribute.

Figure 4:
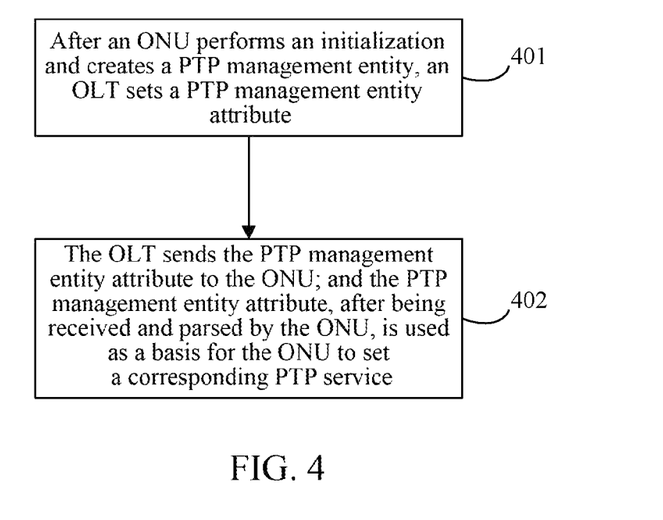
FIG. 4 illustrates a flowchart of implementation of a method for remotely configuring a PTP service of an ONU provided by another embodiment of the present disclosure.

The embodiment of the present disclosure further provides a method for remotely configuring a PTP service of an ONU. As illustrated in FIG. 4, the method includes steps 401-402.

In step 401, after an ONU performs an initialization and creates a PTP management entity, an OLT sets a PTP management entity attribute.

In step 402, the OLT sends the PTP management entity attribute to the ONU.

Herein, the PTP management entity attribute, after being received and parsed by the ONU, is used as a basis for the ONU to set a corresponding PTP service.

Refined description of steps 401 and 402 is the same as that of the method illustrated in FIG. 2 and thus is not described in detail.

In one embodiment, the method provided by the embodiment of the present disclosure further includes the following operation.

The OLT sets an operation type of the PTP management entity and sends the operation type of the PTP management entity to the ONU.

In one embodiment, the method in the embodiment of the present disclosure further includes the following operations.

If a PTP service type needs to be changed in a system operation process, the OLT sets a new PTP management entity attribute and sends the new PTP management entity attribute to the ONU.

Herein, the new PTP management entity attribute, after being received and parsed by the ONU, is used as a basis for the ONU to set a new PTP service.

By adopting the embodiment of the present disclosure, after the ONU completes GPON registration, gets on line normally and establishes an OMCI channel, the configuration of the ONU PTP service can be completed at the OLT side, and thereby the remote configuration of the PTP service through the OMCI is realized. In addition, the in-band management of the IP configuration through the ONU is not needed, so IP address resources are saved. Besides, the configuration method provided by the embodiment of the present disclosure is easy to maintain and manage, and facilitates batch configuration.

The method provided by the embodiment of the present disclosure will be described below in detail through specific application scenarios.

Embodiment 1

In the embodiment, an ONU needs to be configured to be in a three-layer IP multicast mode and the following operations need to be performed.

A. After the ONU performs initialization of an OMCI protocol processing module and a PTP processing module, the OMCI protocol processing module creates an instance of a 1588 or PTP management entity.

B. An OMCI protocol processing module in an OLT sets attributes corresponding to the PTP management entity.

Here, the set attributes corresponding to the PTP management entity are as follows:
Set PTP priority and clock class;
Set attribute PTP state to be master;
Set PTP administrative state to be enabled;
Set PTP near-end IP and far-end IP;
Set PTP synchronization step to be 1 step;
Set PTP transport type to be three-layer IP/UDP; and
Set transit mode to be multicast.

C. The OMCI protocol processing module in the OLT sends the PTP management entity attribute to the ONU through a Set message.

D. The OMCI protocol processing module in the ONU receives the Set message sent by the OLT and then performs a parsing, and the PTP processing module in the ONU sets a corresponding PTP service according to the PTP management entity attribute obtained through the parsing performed by the OMCI protocol processing module; and the PTP processing module in the ONU sends a result indicating whether the setting of the PTP service succeeds to the OMCI protocol processing module in the ONU, and then the OMCI protocol processing module feeds a setting result back to the OLT through an OMCI message.

Here, setting contents of the PTP processing module include the followings:
(1) Set PTP priority and clock class attributes;
(2) Set port PTP state attribute to be master;
(3) Set synchronization step to be 1 step;
(4) Set PTP transport type to be three-layer IP-UDP;
(5) Set PTP near-end IP;
(6) Set PTP transit mode to be multicast;
(7) Set PTP far-end IP;
(8) Enable PTP administrative state.

The above-mentioned setting contents (1)-(4) are not strictly limited in sequence, and include but not limited to the above-mentioned setting steps.

After the setting of the ONU is completed, a PTP port starts to send a PTP message, synchronization is realized through message interaction with an opposite-end device. Specific operations are not described in detail in the embodiment of the present disclosure.

Embodiment 2

In the embodiment, an ONU needs to be configured to be in a three-layer IP unicast mode and the following operations need to be performed.

A. After the ONU performs initialization of an OMCI protocol processing module and a PTP processing module, the OMCI protocol processing module creates an instance of a 1588 or PTP management entity.

B. An OMCI protocol processing module in an OLT sets attributes corresponding to the PTP management entity.

Here, the set attributes corresponding to the PTP management entity are as follows:
Set PTP priority and clock class;
Set PTP state attribute to be master;
Set PTP administrative state to be enabled;
Set PTP near-end IP and far-end IP;
Set PTP synchronization step to be 1 step;
Set PTP transport type to be three-layer IP/UDP; and
Set transit mode to be unicast.

C. The OMCI protocol processing module in the OLT sends a PTP management entity attribute to the ONU through a Set message.

D. The OMCI protocol processing module in the ONU receives the Set message sent by the OLT and then performs a parsing, and the PTP processing module in the ONU sets a corresponding PTP service according to the PTP management entity attribute obtained through the parsing performed by the OMCI protocol processing module; and the PTP processing module in the ONU sends a result indicating whether the setting of the PTP service succeeds to the OMCI protocol processing module in the ONU, and then the OMCI protocol processing module feeds a setting result back to the OLT through an OMCI message.

Here, setting contents of the PTP processing module include the followings:
(1) Set PTP priority and clock class attributes;
(2) Set port PTP state attribute to be master;
(3) Set synchronization step to be 1 step;
(4) Set PTP transport type to be three-layer IP-UDP;
(5) Set PTP near-end IP;
(6) Set PTP transit mode to be multicast;
(7) Set PTP far-end IP;
(8) Enable PTP administrative state.

The above-mentioned setting contents (1)-(4) are not strictly limited in sequence, and include but not limited to the above-mentioned setting steps.

Embodiment 3

In the embodiment, an ONU needs to be configured to be in a two-layer (Ethernet package) multicast mode and the following operations need to be performed.

A. After the ONU performs initialization of an OMCI protocol processing module and a PTP processing module, the OMCI protocol processing module creates an instance of a 1588 or PTP management entity.

B. An OMCI protocol processing module in an OLT sets attributes corresponding to the PTP management entity.

Here, the set attributes corresponding to the PTP management entity are as follows:
Set PTP priority and clock class;
Set PTP state attribute to be master;
Set PTP administrative state to be enabled;
Set PTP near-end MAC and far-end MAC;
Set PTP synchronization step to be 2 steps;
Set PTP transport type to be two-layer Ethernet;
Set transit mode to be multicast.

C. The OMCI protocol processing module in the OLT sends the PTP management entity attribute to the ONU through a Set message.

D. The OMCI protocol processing module in the ONU receives the Set message sent by the OLT and then performs a parsing, and the PTP processing module in the ONU sets a corresponding PTP service according to the PTP management entity attribute obtained through the parsing performed by the OMCI protocol processing module; and the PTP processing module in the ONU sends a result indicating whether the setting of the PTP service succeeds to the OMCI protocol processing module in the ONU, and then the OMCI protocol processing module feeds a setting result back to the OLT through an OMCI message.

Here, setting contents of the PTP processing module include the followings:
(1) Set PTP priority and clock class attributes;
(2) Set port PTP state attribute to be master;
(3) Set synchronization step to be 2 steps;
(4) Set PTP transport type to be IEEE Std 802.3 Ethernet package;
(5) Set PTP near-end MAC;
(6) Set PTP transit mode to be multicast;
(7) Set PTP far-end MAC;
(8) Enable PTP administrative state.

The above-mentioned setting contents (1)-(4) are not strictly limited in sequence, and include but not limited to the above-mentioned setting steps.

After the setting of the ONU is completed, a PTP port starts to send a PTP message, synchronization is realized through message interaction with an opposite-end device, and specific operations are not described in detail in the embodiment of the present disclosure.

Figure 5:
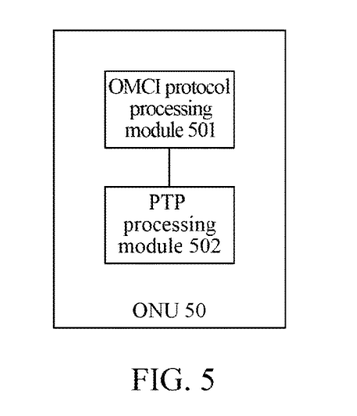
FIG. 5 illustrates a structural schematic diagram of the ONU provided by an embodiment of the present disclosure.

An embodiment of the present disclosure further provides an ONU. As illustrated in FIG. 5, the ONU 50 includes: an OMCI protocol processing module 501 and a PTP processing module 502.

The OMCI protocol processing module 501 is arranged to, after the ONU performs an initialization, create a PTP management entity, and receive the PTP management entity attribute sent by an OLT and set by the OLT, and perform a parsing.

The PTP processing module 502 is arranged to set a corresponding PTP service according to the PTP management entity attribute obtained through the parsing performed by the OMCI protocol processing module 501.

In actual application, the OMCI protocol processing module 501 and the PTP processing module 502 may be implemented through a Central Processing Unit CPU, a Digital Signal Processor DSP or a Field Programmable Gate Array FPGA in the ONU 50.

In one embodiment, the OMCI protocol processing module 501 is further arranged to receive an operation type of the PTP management entity sent by the OLT and set by the OLT.

In one embodiment, if a PTP service type needs to be changed in a system operation process, the OMCI protocol processing module 501 is further arranged to receive a new PTP management entity attribute sent by the OLT and set by the OLT and perform a parsing.

Correspondingly, the PTP processing module 502 is further arranged to set a new PTP service according to the new PTP management entity attribute obtained through the parsing performed by the OMCI protocol processing module 501.

Figure 6:
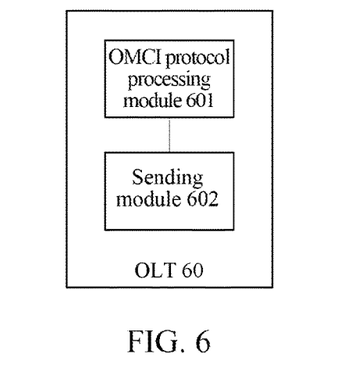
FIG. 6 illustrates a structural schematic diagram of the OLT provided by an embodiment of the present disclosure.

An embodiment of the present disclosure further provides an Optical Line Terminal OLT. As illustrated in FIG. 6, the OLT 60 includes: an OMCI protocol processing module 601 and a sending module 602.

The OMCI protocol processing module 601 is arranged to, after an ONU performs an initialization and creates a PTP management entity, set the PTP management entity attribute.

The sending module 602 is arranged to send the set PTP management entity attribute to the ONU.

Herein, the PTP management entity attribute, after being received and parsed by the ONU, is used as a basis for the ONU to set a corresponding PTP service.

In actual application, the OMCI protocol processing module 601 and the sending module 602 may be implemented through a CPU, a DSP or a FPGA in the OLT 60.

In one embodiment, the OMCI protocol processing module 601 is further arranged to set an operation type of the PTP management entity.

Correspondingly, the sending module 602 is further arranged to send the set operation type of the PTP management entity to the ONU.

In one embodiment, if a PTP service type needs to be changed in a system operation process, the OMCI protocol processing module 601 is further arranged to set a new PTP management entity attribute; and correspondingly, the sending module 602 is further arranged to send the new PTP management entity attribute to the ONU.

Herein, the new PTP management entity attribute, after being received and parsed by the ONU, is used as a basis for the ONU to set a new PTP service.

Figure 7:
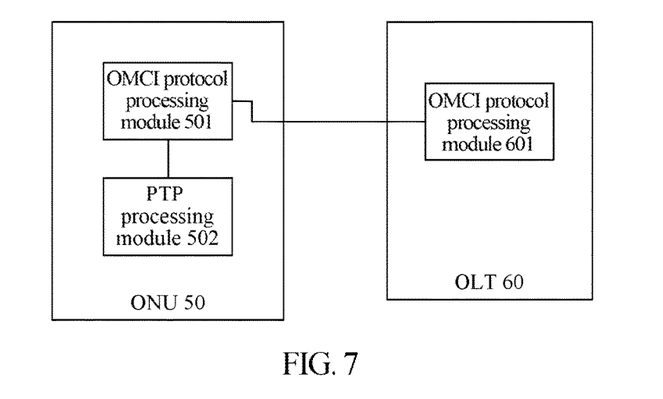
FIG. 7 illustrates a structural schematic diagram of the system provided by an embodiment of the present disclosure.

An embodiment of the present disclosure further provides a system for remotely configuring a PTP service of an ONU. As illustrated in FIG. 7, the system includes: the ONU 50 and the OLT 60 described above.

By adopting the embodiment of the present disclosure, after the ONU completes GPON registration, gets on line normally and establishes an OMCI channel, the configuration of the ONU PTP service can be completed at the OLT side, and thereby the remote configuration of the PTP service through the OMCI is realized. In addition, the in-band management of the IP configuration through the ONU is not needed, so IP address resources are saved. Besides, the configuration method provided by the embodiment of the present disclosure is easy to maintain and manage, and facilitates batch configuration.

One skilled in the art should understand that the embodiments of the present disclosure may be provided in the form of methods, systems or computer program products. Therefore, the present disclosure may adopt the form of full hardware embodiments, full software embodiments or combined software and hardware embodiments. In addition, the present disclosure may adopt the form of computer program products implemented based on one or more of computer usable memory media (including but not limited to disk memories, optical memories, etc.) containing computer usable program codes therein.

The present disclosure is described by referring to flowcharts and/or block diagrams of the methods, the apparatuses (systems) and the computer program products according to the embodiments of the present disclosure. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for realizing functions designated in one process or more processes of the flowcharts and/or one block or more blocks of the block diagrams.

These computer program instructions may also be stored in computer-readable memories which can guide computers or other programmable data processing devices to work in a specific manner, such that the instructions stored in the computer-readable memories produce products including instruction devices, and the instruction devices realize functions designated in one process or more processes of the flowcharts and/or one block or more blocks of the block diagrams.

These computer program instructions may also be loaded to computers or other programmable data processing devices, such that a series of operation steps are executed on the computers or other programmable devices to perform processing realized by the computers, such that the instructions which are executed on the computers or other programmable devices provide steps for realizing functions designated in one process or more processes of the flowcharts and/or one block or more blocks of the block diagrams.

The above-mentioned embodiments are just preferred embodiments of the present disclosure and are not used for limiting the protection scope of the present disclosure.

What is claimed is:

1. A method for remotely configuring a Precision Time Protocol, PTP, service of an Optical Network Unit, ONU, comprising:

after an ONU performs an initialization, creating, by the ONU, a PTP management entity;

receiving, by the ONU, a PTP management entity attribute sent by an OLT and set by the OLT; and parsing, by the ONU, the PTP management entity attribute sent by the OLT and setting, by the ONU, a corresponding PTP service according to the PTP management entity attribute;

wherein the method further comprises:

if a PTP service type needs to be changed in a system operation process, receiving, by the ONU, a new PTP management entity attribute sent by the OLT and set by the OLT; and parsing, by the ONU, the new PTP management entity attribute sent by the OLT and setting, by the ONU, a new PTP service according to the new PTP management entity attribute.

2. The method according to claim 1, wherein a number of PTP management entities created by the ONU is one or more.

3. The method according to claim 2, wherein the method further comprises:

receiving, by the ONU, an operation type of the PTP management entity sent by the OLT and set by the OLT.

4. The method according to claim 1, wherein the method further comprises:

receiving, by the ONU, an operation type of the PTP management entity sent by the OLT and set by the OLT.

5. A method for remotely configuring a Precision Time Protocol, PTP, service of an Optical Network Unit, ONU, comprising:

after an ONU performs an initialization, creating, by the ONU, a PTP management entity;

setting, by an OLT, a PTP management entity attribute and sending, by the OLT, the PTP management entity attribute to the ONU; and receiving and parsing, by the ONU, the PTP management entity attribute and setting, by the ONU, a corresponding PTP service according to the PTP management entity attribute;

wherein the method further comprises:

if a PTP service type needs to be changed in a system operation process, setting, by the OLT, a new PTP management entity attribute and sending, by the OLT, the new PTP management entity attribute to the ONU; and receiving and parsing, by the ONU, the new PTP management entity attribute sent by the OLT and setting, by the ONU, a new PTP service according to the new PTP management entity attribute.

6. The method according to claim 5, wherein the method further comprises:

setting, by the OLT, an operation type of the PTP management entity and sending, by the OLT, the operation type of the PTP management entity to the ONU.

7. A method for remotely configuring a Precision Time Protocol, PTP, service of an Optical Network Unit, ONU, comprising:

after an ONU performs an initialization and creates a PTP management entity, setting, by an OLT, a PTP management entity attribute and sending, by the OLT, the PTP management entity attribute to the ONU;

wherein the PTP management entity attribute, after being received and parsed by the ONU, is used as a basis for the ONU to set a corresponding PTP service;

wherein the method further comprises:

if a PTP service type needs to be changed in a system operation process, setting, by the OLT, a new PTP management entity attribute and sending, by the OLT, the new PTP management entity attribute to the ONU;

wherein the new PTP management entity attribute, after being received and parsed by the ONU, is used as a basis for the ONU to set a new PTP service.

8. The method according to claim 7, wherein the method further comprises:

setting, by the OLT, an operation type of the PTP management entity and sending, by the OLT, the operation type of the PTP management entity to the ONU.

9. An Optical Network Unit, ONU, comprising: an Optical Network Terminal Management and Control Interface, OMCI, protocol processing module and a PTP processing module; wherein, the OMCI protocol processing module is arranged to, after the ONU performs an initialization, create a PTP management entity, and receive a PTP management entity attribute sent by an OLT and set by the OLT, and perform a parsing; and the PTP processing module is arranged to set a corresponding PTP service according to the PTP management entity attribute obtained through the parsing performed by the OMCI protocol processing module;

wherein, if a PTP service type needs to be changed in a system operation process, the OMCI protocol processing module is further arranged to receive a new PTP management entity attribute sent by the OLT and set by the OLT and perform a parsing; and correspondingly, the PTP processing module is further arranged to set a new PTP service according to the new PTP management entity attribute obtained through the parsing performed by the OMCI protocol processing module.

10. The ONU according to claim 9, wherein the OMCI protocol processing module is further arranged to receive an operation type of the PTP management entity sent by the OLT and set by the OLT.

11. A system for remotely configuring a Precision Time Protocol, PTP, service of an Optical Network Unit, ONU, comprising: the ONU according to claim 9 and an OLT;

wherein, the OLT comprises:

an OMCI protocol processing module arranged to, after an ONU performs an initialization and creates a PTP management entity, set a PTP management entity attribute; and a sending module arranged to send the set PTP management entity attribute to the ONU;

wherein the PTP management entity attribute, after being received and parsed by the ONU, is used as a basis for the ONU to set a corresponding PTP service.

12. An Optical Line Terminal, OLT, comprising:

an OMCI protocol processing module arranged to, after an ONU performs an initialization and creates a PTP management entity, set a PTP management entity attribute; and a sending module arranged to send the set PTP management entity attribute to the ONU;

wherein the PTP management entity attribute, after being received and parsed by the ONU, is used as a basis for the ONU to set a corresponding PTP service;

wherein, if a PTP service type needs to be changed in a system operation process, the OMCI protocol processing module is further arranged to set a new PTP management entity attribute; and correspondingly, the sending module is further arranged to send the new PTP management entity attribute to the ONU;

wherein the new PTP management entity attribute, after being received and parsed by the ONU, is used as a basis for the ONU to set a new PTP service.

13. The OLT according to claim 12, wherein the OMCI protocol processing module is further arranged to set an operation type of the PTP management entity; and correspondingly, the sending module is further arranged to send the set operation type of the PTP management entity to the ONU.

* * * * *